Figure 1:
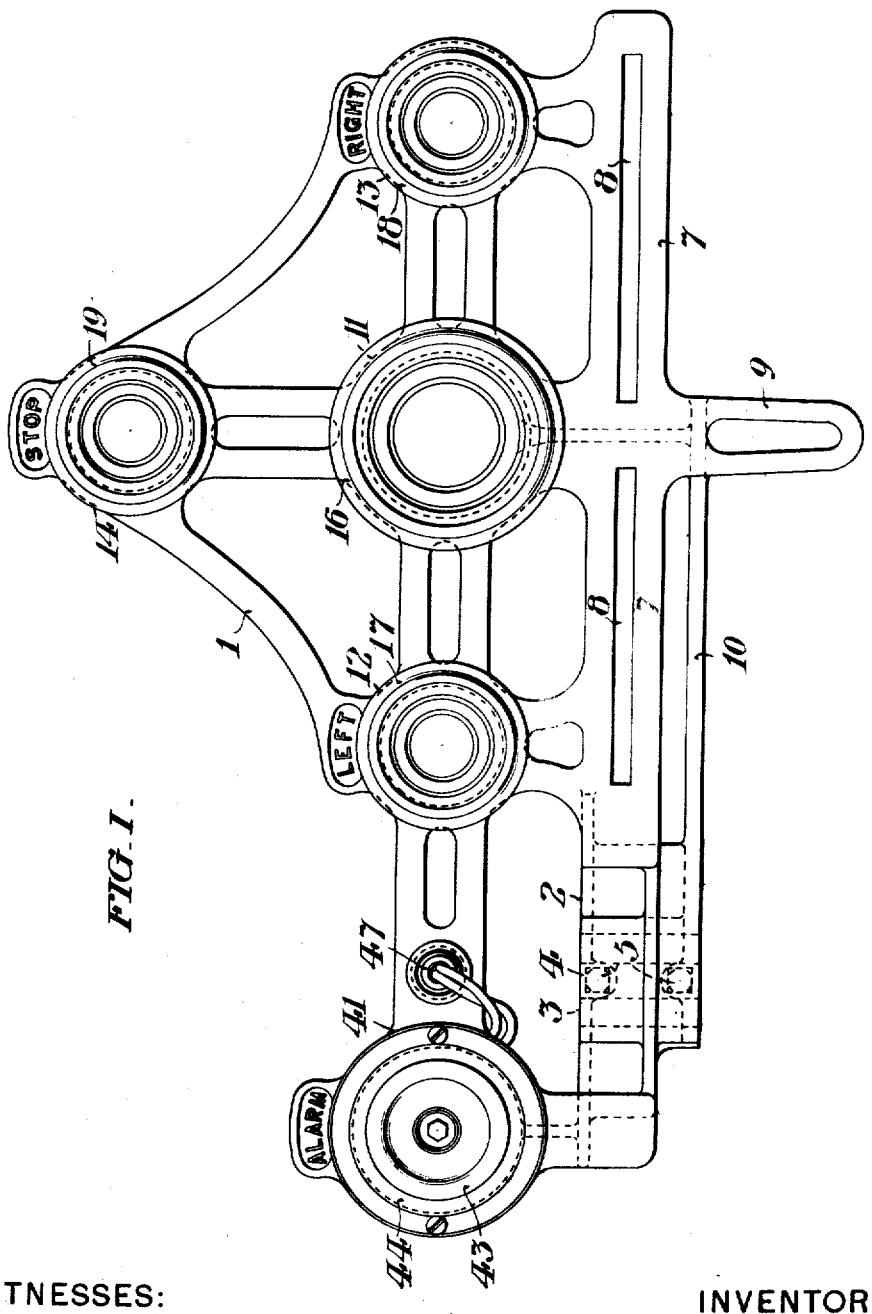

E. M. ROSENBLUTH.
VEHICLE SIGNALING DEVICE.
APPLICATION FILED FEB. 28, 1911.

1,173,121.

Patented Feb. 22, 1916.
9 SHEETS—SHEET 1.

WITNESSES:
Philip W. Vessey.
James McCabe.

INVENTOR:
Edwin M. Rosenbluth
By Arthur E. Paige,
Attorney.

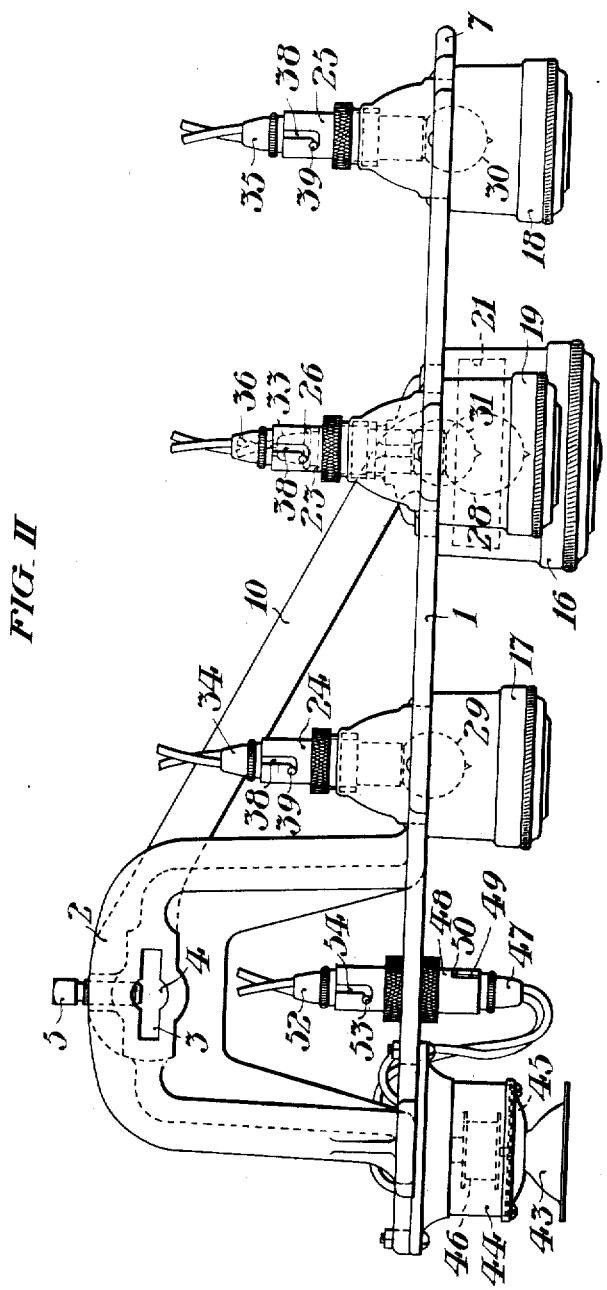

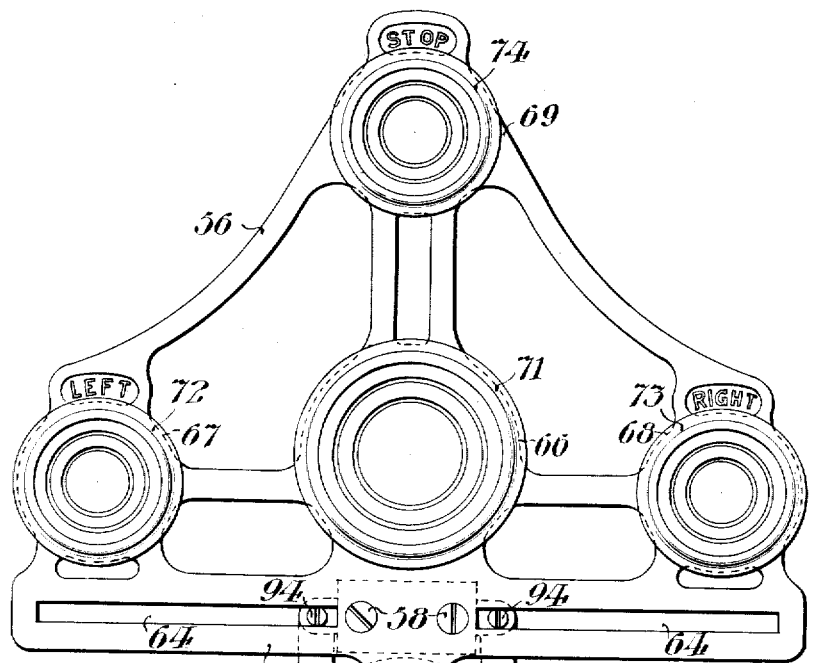
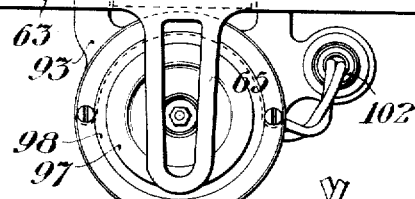
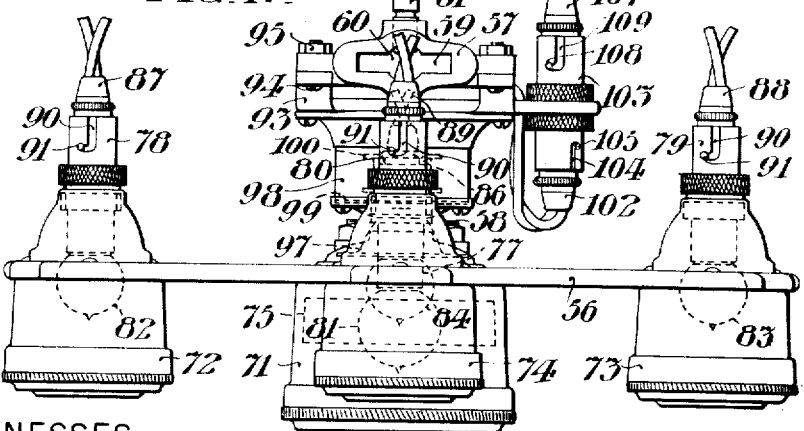

E. M. ROSENBLUTH.
VEHICLE SIGNALING DEVICE.
APPLICATION FILED FEB. 28, 1911.
1,173,121.
Patented Feb. 22, 1916.
9 SHEETS—SHEET 4.
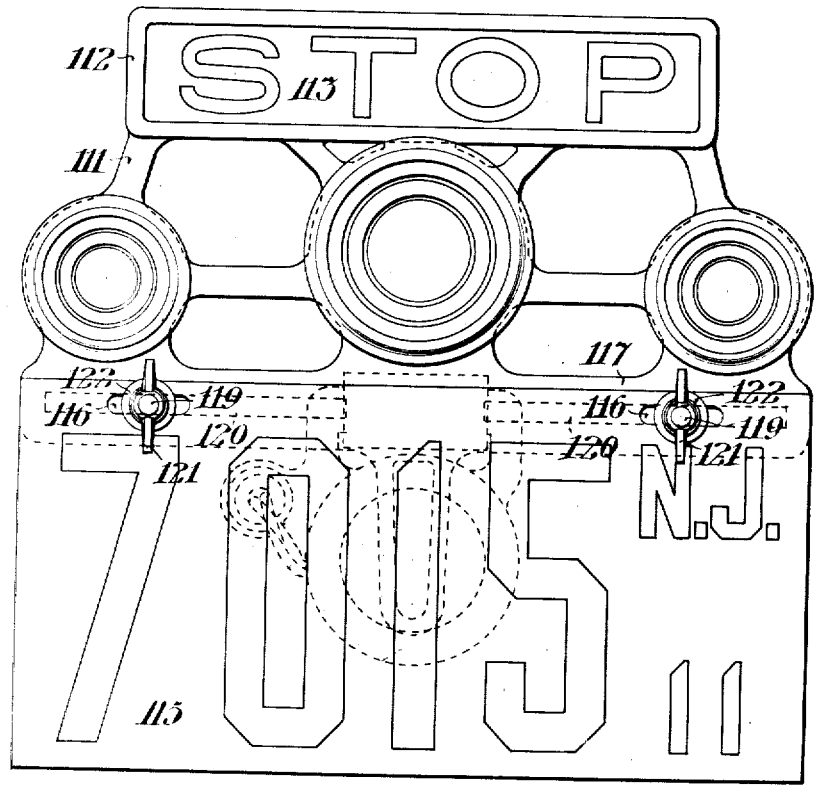
FIG. V.
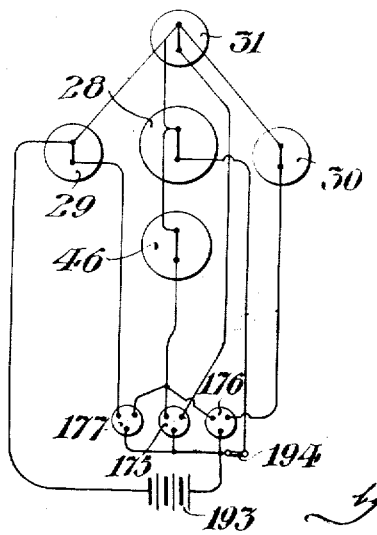
FIG. XV.
WITNESSES:
Philip N. Lacey
James McCabe
INVENTOR:
Edwin M. Rosenbluth
by Arthur E. Paige
Attorney

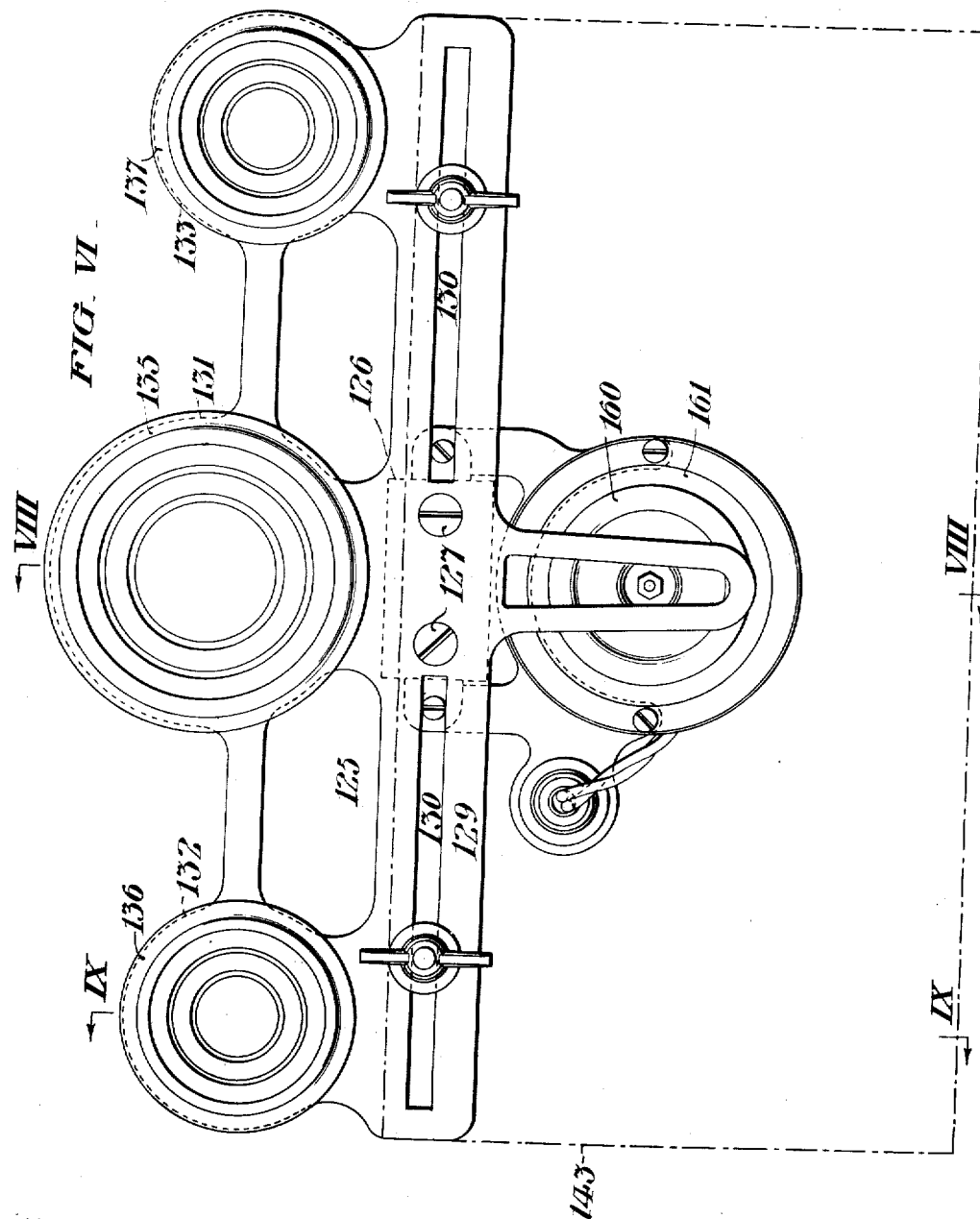

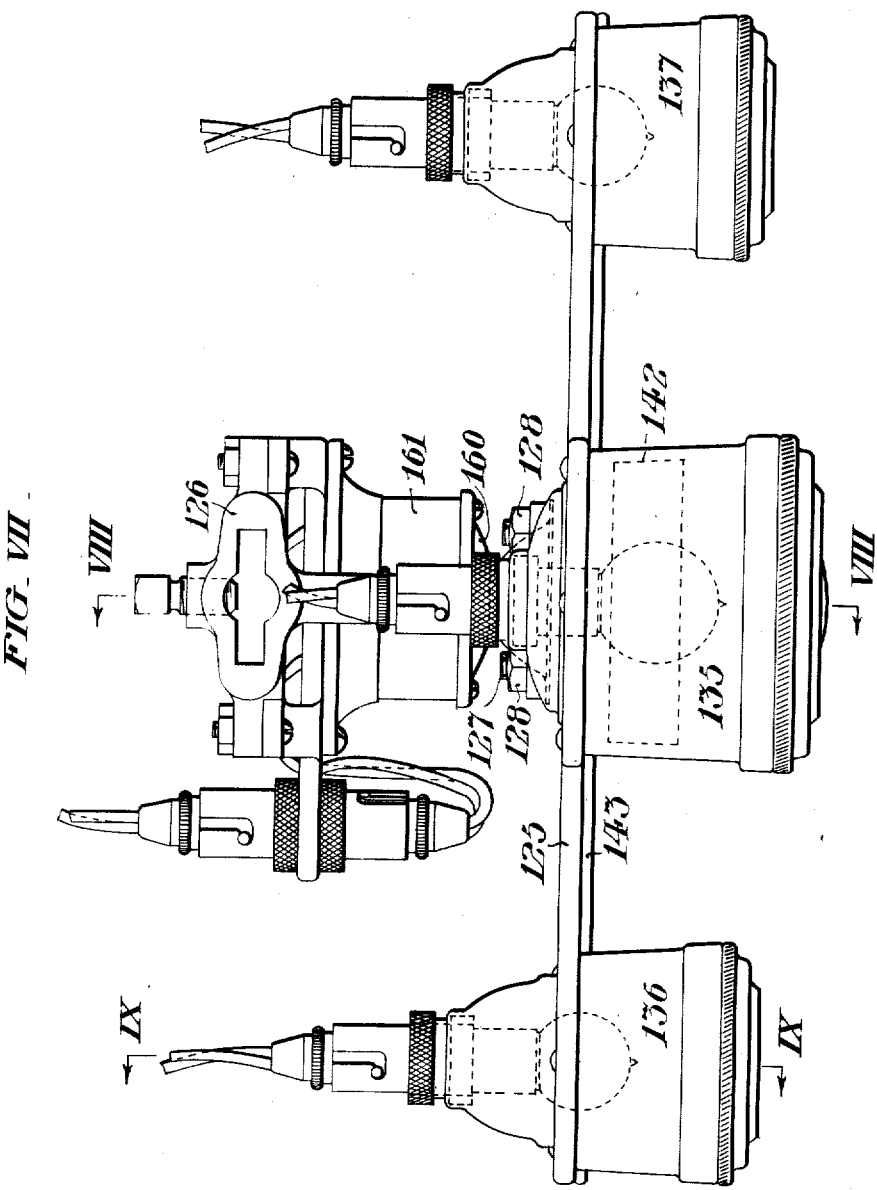

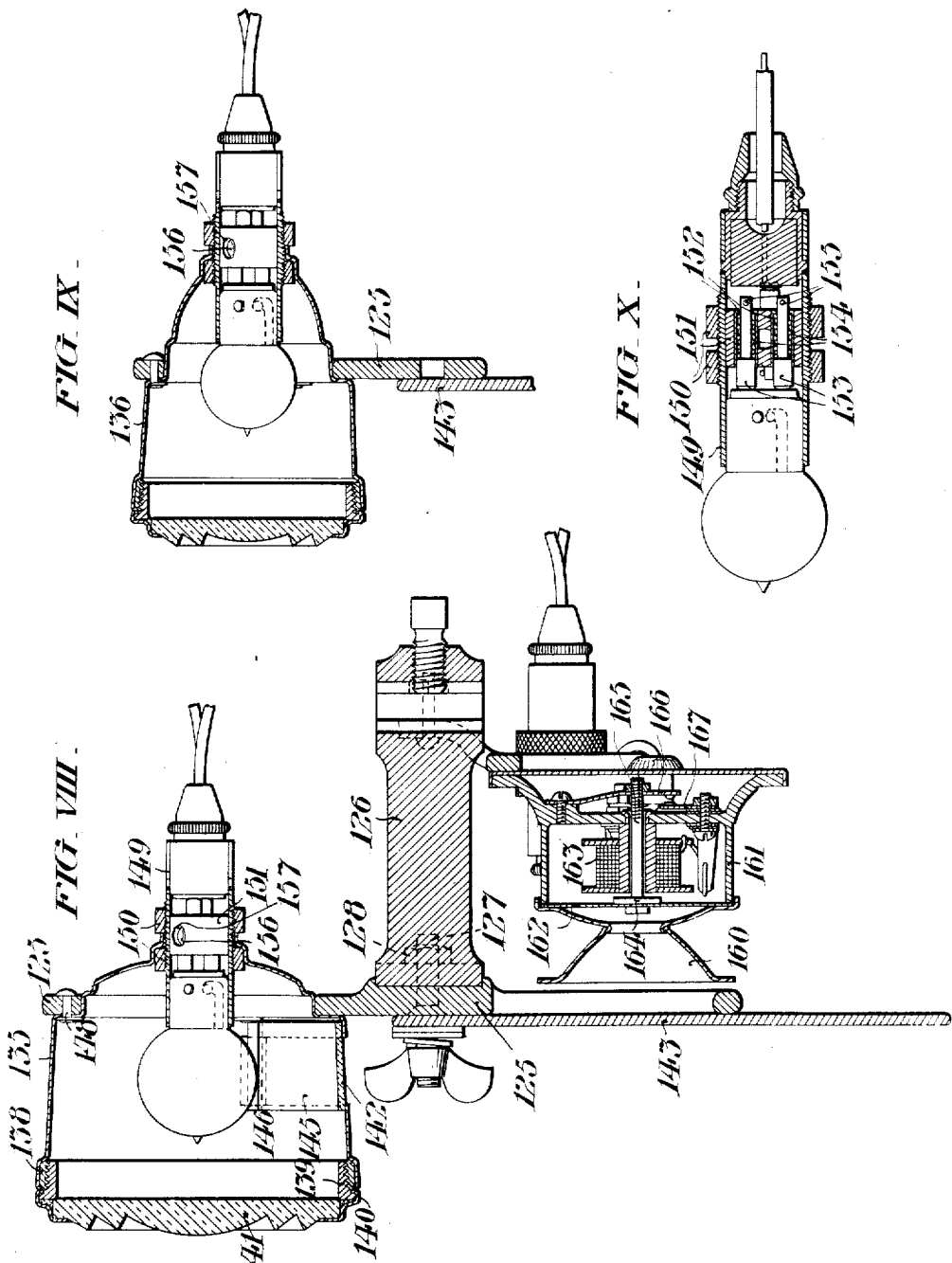

E. M. ROSENBLUTH.
VEHICLE SIGNALING DEVICE.
APPLICATION FILED FEB. 28, 1911.
1,173,121.
Patented Feb. 22, 1916.
9 SHEETS—SHEET 8.
FIG. XI.
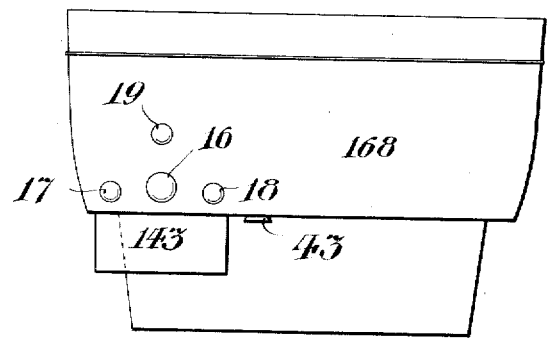
FIG. XII.
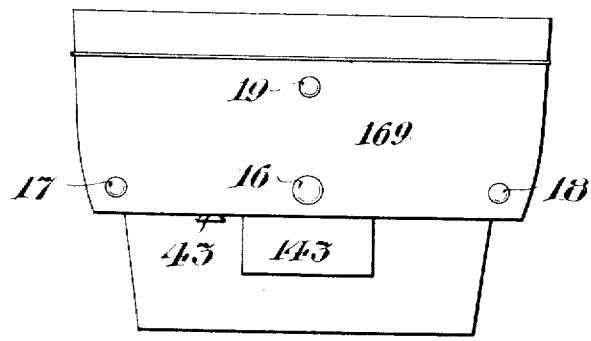
WITNESSES:
Philip W. Vessey
James McCabe
INVENTOR:
Edwin M. Rosenbluth,
by Arthur E. Paige
Attorney

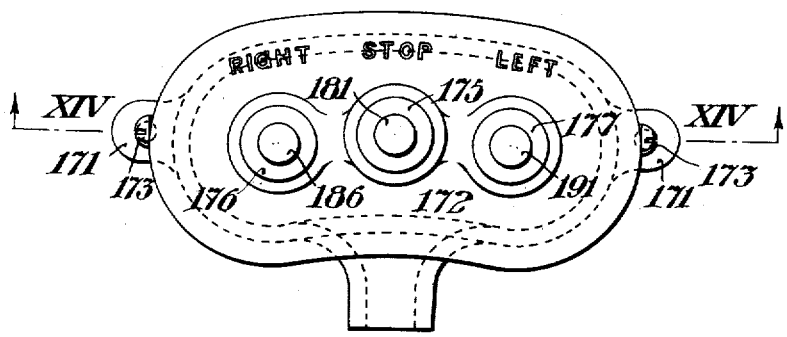
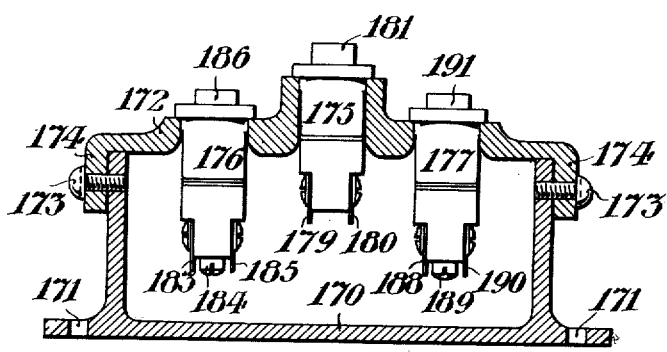

UNITED STATES PATENT OFFICE.

EDWIN M. ROSENBLUTH, OF PHILADELPHIA, PENNSYLVANIA.

VEHICLE SIGNALING DEVICE.

1,173,121.  Specification of Letters Patent.  Patented Feb. 22, 1916.

Application filed February 28, 1911. Serial No. 611,410.

*To all whom it may concern:*

Be it known that I, EDWIN M. ROSENBLUTH, of Philadelphia, in the State of Pennsylvania, have invented a certain new and useful Improvement in Vehicle Signaling Devices, whereof the following is a specification, reference being had to the accompanying drawings.

My invention is particularly applicable to a motor vehicle to display the license number of the same, indicate the intended movement or stoppage of the vehicle, and manifest an audible alarm.

As hereinafter described, my invention provides at the rear of a vehicle, a holder for a license number plate and a group of lamps, one of which being continuously maintained lighted, to manifest a constant signal, also illuminates said number plate;
the other lamps being intermittently lighted to respectively indicate that the vehicle is about to move to the right or left, or stop. As described, said lamps are incandescent electric lamps included in circuits with a triple push button switch of peculiar construction in that the respective buttons are set at different levels so as to be manually distinguishable, without being seen, so that they may be operated in the dark.

My invention also includes an audible alarm comprising a vibratory diaphragm automatically operative by an electric motor in circuit with said push button switch and energized by the same source of electricity as said lamps. Moreover, said audible alarm motor may be so connected in the circuit as to be actuated upon the operation of either of the three members of the push button switch. That is to say, it may be operated contemporaneously with the intermittent operation of each of the lamps indicating movement or stoppage of the vehicle, without other manipulation than that necessary to indicate said movement or stoppage.

As hereinafter described, my invention may be embodied in a device which is separable with respect to the vehicle and provided with means for temporarily attaching it upon an ordinary lamp support at the rear of the vehicle, or, my invention may be embodied in a device located within the body of the vehicle, the respective lamps being displayed at openings in the latter. It may be observed that whereas the former type of my invention is most convenient for attachment to ordinary vehicles; the latter type of my invention is advantageous in that it may be primarily included as a permanent part of the vehicle structure.

My invention includes the various novel features of construction and arrangement hereinafter more definitely specified.

In the drawings:—Figure I is an elevation of the most complex form of my invention, including a frame having means to detachably connect it with an ordinary lamp support on a vehicle, and carrying in coöperative relation, means for supporting a license number plate, a group of lamps including one adapted to continuously illuminate said number plate while serving as a rear danger signal, and, three other lamps respectively operative to indicate that the vehicle is about to move to the right or left or stop, and, a mechanically operative audible signal including a diaphragm in operative relation with an electric motor. Fig. II is a plan view of the embodiment of my invention shown in Fig. I. Fig. III is an elevation of a modified form of my invention including all of the elements specified with respect to the form of my invention shown in Figs. I and II but organized in connection with a frame of a different form. Fig. IV is a plan view of the embodiment of my invention shown in Fig. III. Fig. V is an elevation of a form of my invention having all of the elements specified in reference to Figs. I and II, but including means to display a word signal that the vehicle is about to stop. Fig. VI is an elevation of a modified form of my invention, omitting the means for indicating that the vehicle is about to stop, but including the other elements above specified. Fig. VII is a plan view of the embodiment of my invention shown in Fig. VI. Fig. VIII is a vertical sectional view taken on the line VIII, VIII in Figs. VI and VII. Fig. IX is a vertical sectional view taken on the line IX, IX in Figs. VI and VII. Fig. X is a sectional view taken on the line IX, IX in Figs. VI and VII but on a larger scale. Fig. XI is a rear elevation of a vehicle body having within it an embodiment of my invention including a group of lamps in coöperative relation with a license number plate holder and an audible alarm similar to such elements shown in Fig. I, but displayed through openings in said vehicle body. Fig. XII is a rear elevation of a vehicle body similar to Fig. XI but including a modified form of my invention. Fig. XIII is a plan view of the triple push button switch aforesaid. Fig. XIV is a sectional view of said switch taken on the line XIV, XIV, in Fig. XIII. Fig. XV is a wiring diagram for the most complex form of my invention.

Referring to the form of my invention shown in Figs. I and II, the frame 1 has means for detachably connecting it with a vehicle, including a socket member 2 having an elongated slot 3 with a central enlargement 4 and set screws 5 adapted to be adjusted across said enlargement. Said elongated slot and central enlargement are adapted to respectively fit a flat lamp support and a round lamp support of ordinary construction with which automobiles are provided. Said frame includes a holder for a license number plate consisting of the plane bar 7 having the slots 8 for attaching means, and the central pendant 9 adapted to support said plate connected by the brace 10 with said socket member 2; also holders 11, 12, 13 and 14 for a group of lamps; said holders being respectively provided with lamp casings 16, 17, 18 and 19 fitted in said frame; said casing 11 being centrally disposed above said number plate holder 7 and having a glazed opening 21 in its lower side whereby light may be transmitted upon the number plate attached to said holder.

It is to be understood that when the frame above described is mounted upon the rear of a vehicle the light is continuously maintained in said lamp casing 16 to illuminate the number plate upon the holder 7, and lights are intermittently produced in the casings 17, 18 and 19 to respectively indicate that the vehicle is about to turn to the left, to the right, or stop. The lamp sockets 23, 24, 25 and 26 are respectively detachably connected with said lamp casings 16, 17, 18 and 19, and the electric incandescent lamps 28, 29, 30 and 31 are respectively detachably connected with said sockets. Said lamps are respectively included in electric circuits which energize them, by means of plugs 33, 34, 35 and 36 which are also detachably connected with said sockets; the latter having bayonet slots 38 to receive the locking pins 39 on said plugs as indicated in Fig. II. Said frame 1 also includes an audible alarm holder 41 which is conveniently cast in unitary relation with said socket member 2 and plate holder 7 and lamp holders above described. Said alarm includes the horn 43 carried by the casing 44 inclosing the vibratory diaphragm 45 operatively connected with the electric motor 46 which is included in an electric circuit adapted to energize it by means of the detachable plug 47, the socket 48 detachably fitted in said frame 1, having the bayonet slot 49 adapted to engage the locking pins 50 on said plug; said socket also being adapted to receive the plug 52 having the locking pins 53 engaging the bayonet slot 54.

Referring to Figs. III and IV it may be observed that the frame 56 is similar to the frame 1 above described except that the laterally extending socket member 2 and alarm holder 41 are omitted and devices having the same functions but different forms are substituted for the same. In this form of my invention, the socket member 57 being primarily separate from the frame 56 is detachably connected therewith by the screws 58, but has the elongated slot 59 with the central enlargement 60 and set screws 61 adapted to be adjusted across said enlargement, like the socket member shown in Figs. I and II. Said frame 56 includes a holder for a license number plate consisting of the plane bar 63 having the slots 64 for attaching means and the central pendant 65 adapted to support said plate; also holders 66, 67, 68 and 69 for a group of lamps, said holders being respectively provided with lamp casings 71, 72, 73 and 74 fitted in said frame 56. Said casing 71 is centrally disposed above said number plate holder 63 and has the glazed opening 75 in its lower side, whereby light may be transmitted upon the number plate attached to said holder. The lamp sockets 77, 78, 79 and 80 are respectively detachably connected with said lamp casings 71, 72, 73 and 74, and, the electric incandescent lamps 81, 82, 83 and 84 are respectively detachably connected with said sockets. Said lamps are respectively included in electric circuits which energize them by means of plugs 86, 87, 88 and 89 which are also detachably connected with said sockets, the latter having bayonet slots 90 to receive the locking pins 91 on said plugs as indicated in Fig. IV. Said frame 56 also includes the audible alarm holder 93 detachably connected with said socket member 57 by the screws 94 having the locking nuts 95. Said alarm includes the horn 97 projecting from the casing 98 inclosing the vibratory diaphragm 99 operatively connected with the electric motor 100 included in an electric switch adapted to energize it by means of the detachable plug 102; the socket 103 having the bayonet slot 104 adapted to engage the locking pins 105 of said plug; said socket also being adapted to receive the plug 107 having the locking pins 108 engaging the bayonet slots 109. The form of my invention shown in Fig. V differs from that shown in Figs. III and IV in that the upper part of the frame 111 is modified to support the lamp casing 112 which is substituted for the lamp casing 74 shown in Fig. III to include a transparent panel 113 manifesting the word signal "Stop".

The license number plate 115 shown in Fig. V is such a plate as above contemplated to be detachably connected with the various forms of my invention herein described and being provided with slots 116 at its upper edge is conveniently connected with the holder 117 by means including bolts 119 extending through the slots 120 in said holder; said bolts being conveniently provided with wing nuts 121 and flexible means such as the spring washers 122 to connect said plate 115 with said holder.

The form of my invention shown in Figs. VI to X inclusive is similar to that shown in Fig. V but differs therefrom in the omission of the stop signal lamp at the top thereof; the frame 125 having the socket member 126 primarily separate from the frame 125 but detachably connected therewith by the screws 127 having the lock nuts 128. Said frame 125 includes a holder for a license number plate consisting of the plane bar 129 having the slots 130 for attaching means as above described; also holders 131, 132 and 133 for a group of lamps, said holders being respectively provided with lamp casings 135, 136 and 137. Fig. VIII shows a sectional view of the casing 135 which is similar to the casings 16 and 71 above described, having a screw threaded ring 138 stationary therein to engage the removable cover comprising the screw threaded ring 139 having the flange 140 engaging the lens 141. The opening 142 in the bottom of said casing 135 through which light may be transmitted upon the number plate 143 is conveniently provided with the glass 145 detachably held therein by the sheet metal clips 146. Said casing 135 is rigidly connected with the frame 125 by rivets 148 and has the socket 149 detachably connected therewith by the nuts 150 which clamp the back of said casing 135 between them. As shown in Figs. VIII and X, said socket 149 has the insulating bushing 151 permanently secured therein, and, said bushing has four tubular casings 152 permanently secured therein containing reciprocatory plungers 153 pressed outwardly by springs 154 and having their outward movement limited by pins 155 extending through their rear ends. Said plungers 153 are electrically connected in pairs by bridges of solder 156 extending in recesses 157 in said bushing so that each plunger projecting from one side of said bushing is electrically connected with a corresponding plunger upon the opposite side of said bushing but insulated from the other; the function of said plungers being to electrically connect the terminal plugs with the lamp plugs and normally press both plugs outwardly with their pins in engagement with the respective bayonet slots.

Fig. IX is a sectional view through the lamp casing 136 shown in Fig. VI which is similar to the lamp casings 17 and 72 above described and differs from the lamp casing 135, above described in detail, only in being closed at the bottom instead of being provided with an opening to transmit light.

It may be observed that Fig. VIII also shows a sectional view of an audible alarm of the construction indicated in the other figures including the horn 160 projecting from the casing 161 inclosing the vibratory diaphragm 162 which is operatively connected with an electric motor conveniently consisting of the electro-magnet 163 having the armature 164 attached to said diaphragm by the rod 165 carrying at its rear end the resilient vibratory contact lever 166 which is adapted to make and break connection with the stationary terminal 167 in the usual manner; so that when said motor is energized said diaphragm is drawn rearward, the circuit is broken, and the diaphragm being thus released returns to its normal position again completing the circuit so that the operation is repeated.

In each of the forms of my invention shown in Figs. XI and XII, the signaling device is inclosed by the vehicle body, and the signals are manifested through openings in the latter. In the form of my invention shown in Fig. XI, the openings in the vehicle body 168 are at the left hand side thereof being the position usually occupied by the license plate and the lamp which illuminates it. However, in the form of my invention shown in Fig. XII, the openings in the vehicle body 169 are symmetrically disposed with reference to the body. In each of said Figs. XI and XII I have indicated the active elements of the signaling device by the same reference marks used in the description of Figs. I and II.

I find it convenient to operate and control each of the signaling devices above described, by means of electric circuits including a triple push button switch of the construction shown in Figs. XIII and XIV including the casing 170 having lugs 171 conveniently perforated to receive means for securing it upon the vehicle, and, having the removable cover 172 detachably secured by the screws 173 extending through the lugs 174. Said cover includes sockets for three push buttons 175, 176 and 177, said push button 175 having two terminals 179 and 180 which are electrically connected only when the plunger 181 is depressed, said plunger being normally thrust outward to the position shown in Fig. XIV by a spring. Said push button 176 has three terminals 183, 184 and 185 which are electrically connected only when the plunger 186 is depressed, said plunger being normally thrust outward to the position shown in Fig. XIV by a spring. Said push button 177 has three terminals 188, 189, 190 which are electrically connected only when the plunger 191 is depressed, said plunger being normally thrust outward to the position shown in Fig. XIV by a spring.

As shown in Fig. XIV, the central one of said push buttons projects from the casing to a greater extent than the other push buttons in order that said buttons may be manually distinguishable without being seen, it being frequently necessary to operate them in the dark. It is to be understood that said push buttons are so electrically connected in each form of my signaling device that the central projecting button controls the stop signal, and the buttons upon opposite sides thereof respectively control the signals indicating that the vehicle is about to turn to the right or left, and, in the most complex form of my invention including the stop signal and the audible alarm, the latter is connected to be operated by each of the three push buttons so that its operation is contemporaneous with the operation of each of the lamps in the group indicating movement or stoppage of the vehicle. However, in the forms of my invention omitting the stop signal, said central projecting push button is only operatively connected with the audible alarm.

In each form of my invention, a lamp is continuously maintained lighted and lamps laterally disposed in respect thereto are intermittently lighted to respectively indicate the direction of movement of the vehicle. Incidentally, said continuously lighted lamp may serve to illuminate a license number plate, but I do not desire to limit myself to that specific arrangement as I believe it to be broadly new to provide a signaling device to indicate the intended movement of a vehicle consisting of a lamp, which is continuously lighted and other lamps which are intermittently lighted to indicate by their location with respect to the continuously lighted lamp in which direction the vehicle is about to turn.

Fig. XV is a wiring diagram of the most complex form of my invention wherein the elements are conveniently designated by the reference marks employed in Figs. I, II, XIII and XIV. It may be observed that the electric circuits include the source of current 193 in such relation with the group of lamps that the central lamp may be maintained continuously lighted when the switch 194 is closed, and, the lamp 31 at the top of the group, indicating that the vehicle is about to stop, may be intermittently lighted by the operation of the central push button 175; the laterally disposed lamps indicating the direction of turning movement of the vehicle being respectively controlled by the push buttons 176 and 177, and, the audible alarm 43 being connected to be operated by each of said push buttons 175, 176 and 177 contemporaneously with the operation of the respective lamps connected therewith.

Although I have found it convenient to employ electric incandescent lamps, it is to be understood that lamps of different types may be employed, for instance, acetylene gas lamps which may be electrically lighted and extinguished by ordinary devices well known in the art.

I do not desire to limit myself to the precise details of construction and arrangement herein set forth as it is obvious that various modifications may be made therein without departing from the essential features of my invention as defined in the appended claims.

I claim:—

1. In a signaling device, the combination with a frame having means for detachably connecting it with a support on a vehicle, including a socket member having an elongated slot with a central enlargement and a set screw adapted to be adjusted across said enlargement, a holder for a license number plate, holders for a group of lamps, and a holder for an audible alarm; of a group of lamp casings fitted in said frame, including one casing centrally disposed above said number plate holder and having a glazed opening whereby light may be transmitted upon a number plate attached to said holder, two lamp casings respectively upon opposite sides of said central casing, and, a fourth casing above said central casing, including means to manifest a word stop signal; lamp sockets respectively detachably connected with said lamp casings: electric incandescent lamps detachably fitted in said sockets; an audible alarm fitted in said frame, including a vibratory diaphragm an electric motor operatively connected with said diaphragm; an electric switch, including a casing having three push buttons, and, electric circuits including a source of current, said lamps, audible alarm and switch, in such relation that said central lamp may be maintained continuously lighted, the other three lamps may be respectively lighted by manipulation of said buttons, and said audible alarm may be operated contemporaneously with the operation of each of said other three lamps including conductors respectively leading from said source of current to each of said lamps individually and said alarm, except the central lamp, by way of said switch, and a common conductor connected to each of said lamps and audible alarm leading to said source of current independently of said switch.

2. In a signaling device, the combination with a frame having means for detachably connecting it with a vehicle, including a holder for a license number plate, holders for a group of lamps, and a holder for an audible alarm; of a group of lamp casings fitted in said frame, including one casing centrally disposed above said number plate holder and having an opening whereby light may be transmitted upon a number plate attached to said holder, two lamp casings respectively upon opposite sides of said central casing, and, a fourth casing above said central casing, including means to manifest a stop signal; lamp sockets respectively connected with said lamp casings; electric incandescent lamps detachably fitted in said sockets; an audible alarm fitted in said frame, including a vibratory diaphragm an electric motor operatively connected with said diaphragm; an electric switch, including a casing having three push buttons, and, electric circuits including a source of current, said lamps, audible alarm and switch, in such relation that said central lamp may be maintained continuously lighted, the other three lamps may be respectively lighted by manipulation of said buttons, and, said audible alarm may be operated contemporaneously with the operation of each of said other three lamps including conductors respectively leading from said source of current to each of said lamps individually and said alarm, except the central lamp, by way of said switch, and a common conductor connected to each of said lamps and audible alarm leading to said source of current independently of said switch.

3. In a signaling device, the combination with a frame having means for connecting it with a vehicle, including a holder for a license number plate, holders for a group of lamps, and a holder for an audible alarm; of a group of lamp casings fitted in said frame, including one casing centrally disposed above said number plate holder and having an opening whereby light may be transmitted upon a number plate attached to said holder, two lamp casings respectively upon opposite sides of said central casing, and, a fourth casing above said central casing, including means to manifest a stop signal; electric lamps detachably fitted in said casings; an audible alarm fitted in said frame, including a vibratory diaphragm an electric motor operatively connected with said diaphragm; an electric switch, including a casing having three push buttons; and, electric circuits including a source of current, said lamps, audible alarm and switch, in such relation that said central lamp may be maintained continuously lighted, the other three lamps may be respectively lighted by manipulation of said buttons, and, said audible alarm may be operated contemporaneously with the operation of each of said other three lamps including conductors respectively leading from said source of current to each of said lamps individually and said alarm, except the central lamp, by way of said switch, and a common conductor connected to each of said lamps and audible alarm leading to said source of current independently of said switch.

4. In a signaling device, the combination with a frame having means for connecting it with a vehicle, including a holder for a license number plate, holders for a group of lamps, and a holder for an audible alarm; of a group of lamp casings fitted in said frame, including one casing centrally disposed above said number plate holder whereby light may be transmitted upon a number plate attached to said holder, two lamp casings respectively upon opposite sides of said central casing, and, a fourth casing above said central casing; electric lamps in said casings; an audible alarm fitted in said frame, including a vibratory diaphragm an electric motor operatively connected with said diaphragm; an electric switch, including a casing having three push buttons; and, electric circuits including a source of current, said lamps, audible alarm and switch, in such relation that said central lamp may be maintained continuously lighted, the other three lamps may be respectively lighted by manipulation of said buttons, and, said audible alarm may be operated contemporaneously with the operation of each of said other three lamps including conductors respectively leading from said source of current to each of said lamps individually and said alarm, except the central lamp, by way of said switch, and a common conductor connected to each of said lamps and audible alarm leading to said source of current independently of said switch.

5. In a signaling device, the combination with a frame having means for detachably connecting it with a support on a vehicle, including a socket member having an elongated slot with a central enlargement and a set screw adapted to be adjusted across said enlargement, a holder for a license number plate, holders for a group of lamps, and a holder for an audible alarm; of a group of lamp casings fitted in said frame, including one casing centrally disposed above said number plate holder and having a glazed opening whereby light may be transmitted upon a number plate attached to said holder, two lamp casings respectively upon opposite sides of said central casing, and, a fourth casing above said central casing, including means to manifest a word stop signal; lamps detachably fitted in said casings; an audible alarm fitted in said frame, including a vibratory diaphragm an electric motor operatively connected with said diaphragm; an electric switch, including a casing having three push buttons; and, electric circuits including a source of current, said lamps, audible alarm and switch; whereby, said central lamp may be maintained continuously lighted, the other three lamps may be respectively lighted and extinguished by manipulation of said buttons, and, said audible alarm may be operated contemporaneously with the operation of each of said other three lamps including conductors respectively leading from said source of current to each of said lamps individually and said alarm, except the central lamp, by way of said switch, and a common conductor connected to each of said lamps and audible alarm leading to said source of current independently of said switch.

6. In a signaling device, the combination with a frame having means for connecting it with a vehicle, including a holder for a license number plate, holders for a group of lamps, and a holder for an audible alarm; of a group of lamp casings fitted in said frame, including one casing centrally disposed above said number plate holder and having an opening whereby light may be transmitted upon a number plate attached to said holder, two lamp casings respectively upon opposite sides of said central casing, and, a fourth casing above said central casing, including means to manifest a stop signal; lamps detachably fitted in said casings; an audible alarm fitted in said frame; an electric switch including three push buttons; and, electric circuits including a source of current, said lamps, audible alarm and switch, in such relation that said central lamp may be maintained continuously lighted, the other three lamps may be respectively lighted by manipulation of said buttons, and, said audible alarm may be operated contemporaneously with the operation of each of said other three lamps including conductors respectively leading from said source of current to each of said lamps individually and said alarm, except the central lamp, by way of said switch, and a common conductor connected to each of said lamps and audible alarm leading to said source of current independently of said swtich.

7. In a signaling device, the combination with a frame having means for connecting it with a vehicle, including a holder for a license number plate, holders for a group of lamps, and a holder for an audible alarm; of a group of lamp casings fitted in said frame, including one casing centrally disposed above said number plate holder whereby light may be transmitted upon a number plate attached to said holder, two lamp casings respectively upon opposite sides of said central casing, and, a fourth casing above said central casing, including means to manifest a stop signal; electric lamps detachably fitted in said casings; an audible alarm fitted in said frame, an electric motor operatively connected with said diaphragm; an electric switch, including a casing; and, electric circuits including a source of current, said lamps, audible alarm and switch, in such relation that said central lamp may be maintained continuously lighted, the other three lamps may be respectively lighted by manipulation of said switch, and, said audible alarm may be operated contemporaneously with the operation of each of said other three lamps, including conductors respectively leading from said source of current to each of said lamps individually and said alarm, except the central lamp, by way of said switch, and a common conductor connected to each of said lamps and audible alarm leading to said source of current independently of said switch.

8. In a signaling device, the combination with a frame having means for connecting it with a vehicle, including a holder for a license number plate, holders for a group of lamps, and a holder for an audible alarm; of a group of lamp casings fitted in said frame, including one central casing whereby light may be transmitted upon a number plate attached to said holder, two lamp casings respectively upon opposite sides of said central casing, and, a fourth casing above said central casing, including means to manifest a stop signal; electric lamps detachably fitted in said casings; an audible alarm fitted in said frame, an electric motor operatively connected with said diaphragm; an electric switch, including a casing; and, electric circuits including a source of current, said lamps, audible alarm and switch, in such relation that said central lamp may be maintained continuously lighted, the other three lamps may be respectively lighted by manipulation of said switch, and, said audible alarm may be operated, including conductors respectively leading from said source of current to each of said lamps individually and said alarm, except the central lamp, by way of said switch, and a common conductor connected to each of said lamps and audible alarm leading to said source of current independently of said switch.

9. In a signaling device, the combination with a vehicle; of a holder for a license number plate, holders for a group of lamps, and a holder for an audible alarm; a group of electric lamps, including one whereby light may be transmitted upon a number plate attached to said holder, two upon opposite sides of said lamp, and, a fourth having means to manifest a stop signal; an audible alarm, an electric motor operatively connected with said diaphragm; an electric switch; and, electric circuits including a source of current, said lamps, audible alarm and switch, in such relation that said first lamp may be maintained continuously lighted, the other three lamps may be respectively lighted by manipulation of said switch, and, said audible alarm may be operated contemporaneously with the operation of each of said other three lamps, including conductors respectively leading from said source of current to each of said lamps individually and said alarm, except the central lamp, by way of said switch, and a common conductor connected to each of said lamps and audible alarm leading to said source of current independently of said switch.

10. In a signaling device, the combination with a vehicle; of a holder for a license number plate, holders for a group of lamps, and a holder for an audible alarm; a group of electric lamps, including one whereby light may be transmitted upon a number plate attached to said holder, two upon opposite sides of said lamp, and, a fourth having means to manifest a stop signal; an audible alarm and electric motor operatively connected with said diaphragm; an electric switch; and, electric circuits including a source of current, said lamps, audible alarm and switch, in such relation that said first lamp may be maintained continuously lighted, the other three lamps may be respectively lighted by manipulation of said switch, and, said audible alarm may be operated, including conductors respectively leading from said source of current to each of said lamps individually and said alarm, except the central lamp, by way of said switch, and a common conductor connected to each of said lamps and audible alarm leading to said source of current independently of said switch.

11. In a signaling device, the combination with a frame having means for detachably connecting it with a support on a vehicle, including a socket member having an elongated slot with a central enlargement and a set screw adapted to be adjusted across said enlargement, a holder for a license number plate, holders for a group of lamps, and a holder for an audible alarm; of a group of lamp casings fitted in said frame, including one casing centrally disposed above said number plate holder, whereby light may be transmitted upon a number plate attached to said holder, and, two lamp casings respectively upon opposite sides of said central casing; lamp sockets respectively detachably connected with said lamp casings; electric incandescent lamps detachably fitted in said sockets; an audible alarm fitted in said frame, including a vibratory diaphragm an electric motor operatively connected with said diaphragm; an electric switch, including a casing having three push buttons, and, electric circuits including a source of current, said lamps, audible alarm and switch, in such relation that said central lamp may be maintained continuously lighted, the other two lamps may be respectively lighted by manipulation of said buttons, and, said audible alarm may be operated contemporaneously with the operation of each of said other two lamps including conductors respectively leading from said source of current to each of said lamps individually and said alarm, except the central lamp, by way of said switch, and a common conductor connected to each of said lamps and audible alarm leading to said source of current independently of said switch.

12. In a signaling device, the combination with a frame having means for detachably connecting it with a vehicle, including a holder for a license number plate, holders for a group of lamps, and a holder for an audible alarm; of a group of lamp casings fitted in said frame; including one casing centrally disposed above said number plate holder, whereby light may be transmitted upon a number plate attached to said holder, two lamp casings respectively upon opposite sides of said central casing; lamp sockets respectively connected with said lamp casings; electric incandescent lamps detachably fitted in said sockets; an audible alarm fitted in said frame, an electric motor operatively connected with said diaphragm; an electric switch, including a casing having three push buttons; and, electric circuits including a source of current, said lamps, audible alarm and switch, in such relation that said central lamp may be maintained continuously lighted, the other two lamps may be respectively lighted by manipulation of said buttons, and, said audible alarm may be operated contemporaneously with the operation of each of said other two lamps including conductors respectively leading from said source of current to each of said lamps individually and said alarm, except the central lamp, by way of said switch, and a common conductor connected to each of said lamps and audible alarm leading to said source of current independently of said switch.

13. In a signaling device, the combination with a frame having means for detachably connecting it with a support on a vehicle, a holder for a license number plate, holders for a group of lamps, and a holder for an audible alarm; of a group of lamp casings fitted in said frame, including one whereby light may be transmitted upon a number plate attached to said holder, two lamp casings respectively upon opposite sides of said first casing; lamp sockets respectively detachably connected with said lamp casings; electric lamps detachably fitted in said sockets; an audible alarm fitted in said frame, an electric motor operatively connected with said diaphragm; an electric switch, including a casing having three push buttons, electric circuits including a source of current, said lamps, audible alarm and switch, in such relation that said central lamp may be maintained continuously lighted, the other two lamps may be respectively lighted by manipulation of said buttons, and, said audible alarm may be operated contemporaneously with the operation of each of said other lamps including conductors respectively leading from said source of current to each of said lamps individually and said alarm, except the central lamp, by way of said switch, and a common conductor connected to each of said lamps and audible alarm leading to said source of current independently of said switch.

14. In a signaling device, the combination with a frame having means for detachably connecting it with a vehicle, including a holder for a license number plate, holders for a group of lamps, and a holder for an audible alarm; of a group of lamp casings fitted in said frame, including one casing whereby light may be transmitted upon a number plate attached to said holder, two lamp casings respectively upon opposite sides of said first casing; lamp sockets respectively connected with said lamp casings; electric incandescent lamps detachably fitted in said sockets; an audible alarm fitted in said frame, an electric motor operatively connected with said diaphragm; an electric switch; and, electric circuits including a source of current, said lamps, audible alarm and switch, in such relation that said first lamp may be maintained continuously lighted, the other two lamps may be respectively lighted by manipulation of said switch, and, said audible alarm may be operated contemporaneously with the operation of each of said other lamps including conductors respectively leading from said source of current to each of said lamps individually and said alarm, except the central lamp, by way of said switch, and a common conductor connected to each of said lamps and audible alarm leading to said source of current independently of said switch.

15. In a signaling device, the combination with a frame having means for connecting it with a vehicle, including a holder for a license number plate, and holders for a group of lamps; of a group of lamp casings fitted in said frame, including one casing whereby light may be transmitted upon a number plate attached to said holder, two lamp casings respectively upon opposite sides of said first lamp, and, a fourth casing above said central casing; electric lamps in said casings; and electric switch; and, electric circuits including a source of current, said lamps, and switch, in such relation that said first lamp may be maintained continuously lighted, and the other three lamps may be respectively lighted by manipulation of said switch including conductors respectively leading from said source of current to each of said lamps individually, except the central lamp, by way of said switch, and a common conductor connected to each of said lamps leading to said source of current independently of said switch.

16. In a signaling device, the combination with a frame having means for connecting it with a vehicle, including a holder for a license number plate, and holders for a group of lamps; of a group of electric lamps, including one lamp whereby light may be transmitted upon a number plate attached to said holder, two lamps respectively upon opposite sides of said first lamp, and, a fourth lamp above said central casing; an electric switch; and electric circuits including a source of current, said lamps, and switch, in such relation that said first lamp may be maintained continuously lighted, and the other three lamps may be respectively lighted by manipulation of said switch including conductors respectively leading from said source of current to each of said lamps individually, except the central lamp, by way of said switch, and a common conductor connected to each of said lamps leading to said source of current independently of said switch.

17. In a signaling device, the combination with a frame having means for connecting it with a vehicle, including a holder for a license number plate, and holders for a group of lamps; of a group of electric lamps, including one lamp whereby light may be transmitted upon a number plate attached to said holder and two lamps respectively upon opposite sides of said first lamp; an electric switch, and, electric circuits including a source of current, said lamps, and switch, in such relation that said first lamp may be maintained continuously lighted, and the other lamps may be respectively lighted by manipulation of said switch including conductors respectively leading from said source of current to each of said lamps individually, except the central lamp, by way of said switch, and a common conductor connected to each of said lamps leading to said source of current independently of said switch.

18. The combination with a vehicle; of a signaling device, including a holder for a license number plate, holders for a group of lamps and a holder for an audible alarm; a group of electric lamps including one whereby light may be transmitted upon a number plate attached to said holder, two upon opposite sides of said first lamp, and, a fourth lamp having means to manifest a stop signal; an audible alarm an electric motor operatively connected with said diaphragm; an electric switch; and, electric circuits including a source of current, said lamps, audible alarm and switch, in such relation that said first lamp may be maintained continuously lighted, the other three lamps may be respectively lighted by manipulation of said switch, and, said audible alarm may be operated contemporaneously with the operation of each of said other three lamps including conductors respectively leading from said source of current to each of said lamps and audible alarm individually, except the central lamp, by way of said switch, and a common conductor connected to each of said lamps and audible alarm leading to said source of current independently of said switch.

19. The combination with a vehicle; of a signaling device, including a holder for a license number plate, and holders for a group of lamps and a holder for an audible alarm; a group of electric lamps including one whereby light may be transmitted upon a number plate attached to said holder, two upon opposite sides of said first lamp, and, a fourth lamp having means to manifest a stop signal; an audible alarm and electric motor operatively connected with said diaphragm; an electric switch; and, electric circuits including a source of current, said lamps, audible alarm and switch, in such relation that said first lamp may be maintained continuously lighted, the other three lamps may be respectively lighted by manipulation of said switch, and, said audible alarm may be operated including conductors respectively leading from said source of current to each of said lamps and audible alarm individually, except the central lamp, by way of said switch, and a common conductor connected to each of said lamps and audible alarm leading to said source of current independently of said switch.

20. The combination with a vehicle; of a signaling device, including a holder for a license number plate, and holders for a group of lamps; a group of electric lamps including one whereby light may be transmitted upon a number plate attached to said holder, two upon opposite sides of said first lamp, and, a fourth lamp having means to manifest a stop signal; an electric switch; and, electric circuits including a source of current, said lamps, and switch, in such relation that said first lamp may be maintained continuously lighted, and the other lamps may be respectively lighted by manipulation of said switch including conductors respectively leading from said source of current to each of said lamps individually, except the central lamp, by way of said switch and a common conductor connected to each of said lamps leading to source of current independently of said switch.

21. The combination with a vehicle; of a signaling device, including a holder for a license number plate, and holders for a group of lamps; a group of electric lamps including one whereby light may be transmitted upon a number plate attached to said holder, and two upon opposite sides of said first lamp; an electric switch; and, electric circuits including a source of current, said lamps, and switch, in such relation that said first lamp may be maintained continuously lighted, and the other lamps may be respectively lighted by manipulation of said switch including conductors respectively leading from said source of current to each of said lamps individually, except the central lamp, by way of said switch, and a common conductor connected to each of said lamps leading to said source of current independently of said switch.

22. The combination with a vehicle; of a signaling device including a holder for a license number plate, and holders for a group of lamps; a group of lamps including one whereby light may be transmitted upon a number plate attached to said holder, and two upon opposite sides of said first lamp; and, means whereby said first lamp may be maintained continuously lighted and said other lamps may be intermittently lighted; whereby the direction of the intended movement of said vehicle may be indicated by said intermittently lighted lamps with reference to said continuously lighted lamp including conductors respectively leading from said source of current to each of said lamps individually, except the central lamp, by way of said switch and a common conductor connected to each of said lamps leading to said source of current independently of said switch.

23. The combination with a vehicle; of a signaling device including a holder for a license number plate, and holders for a group of lamps; a license number plate detachably connected with said holder; a group of lamps including one whereby light may be transmitted upon a number plate attached to said holder, and two upon opposite sides of said first lamp; and, means whereby said first lamp may be maintained continuously lighted and said other lamps may be intermittently lighted; whereby the direction of the intended movement of said vehicle may be indicated by said intermittently lighted lamps with reference to said continuously lighted lamp.

24. The combination with a vehicle; of a signaling device including a holder for a license number plate, and holders for a group of lamps; a group of lamps including one whereby light may be transmitted upon a number plate attached to said holder, and two upon opposite sides of said first lamp; and, means whereby said first lamp may be maintained continuously lighted and said other lamps may be intermittently lighted; whereby the direction of the intended movement of said vehicle may be indicated by said intermittently lighted lamps with reference to said continuously lighted lamp.

In testimony whereof, I have hereunto signed my name at Philadelphia, Pennsylvania, this twentieth day of February, 1911.

EDWIN M. ROSENBLUTH.

Witnesses:
ARTHUR E. PAIGE,
GERTRUDE N. R. MATTSON.

It is hereby certified that in Letters Patent No. 1,173,121, granted February 22, 1916, upon the application of Edwin M. Rosenbluth, of Philadelphia, Pennsylvania, for an improvement in "Vehicle Signaling Devices," errors appear in the printed specification requiring correction as follows: Page 4, line 46, after the word "lamp" strike out the comma; same page, line 108, strike out the colon and insert a semicolon; page 5, lines 19, 56, 130, page 7, line 62, after the word "diaphragm" insert a semicolon; page 5, line 22, page 7, line 65, page 8, line 3, after the word "buttons" strike out the comma and insert a semicolon; page 6, line 128, after the word "alarm" strike out the comma and insert a semicolon; page 7, line 25, page 8, line 130, page 9, line 28, after the word "alarm" insert a semicolon; page 7, line 25, page 9, line 28, for the word "and" read *an*; page 7, lines 97 and 130, page 8, line 34, after the word "frame" strike out the comma and insert a semicolon; and that the said Letters Patent should be read with these corrections therein that the same may conform to the record of the case in the Patent Office.

Signed and sealed this 28th day of March, A. D., 1916.

[SEAL.]

Cl. 177—337.

J. T. NEWTON,
*Acting Commissioner of Patents.*